United States Patent [19]

Cassanelli et al.

[11] 3,734,745

[45] May 22, 1973

[54] MULTI-LAYERED, MULTI-COLORED DESSERTS

[75] Inventors: Robert R. Cassanelli, Yorktown Heights; Ronald P. Wauters, Vails Gate; Anastasia C. Wirchansky, Yonkers, all of N.Y.; Clement R. Wyss, Park Ridge, N.J.

[73] Assignee: General Foods Corporation, White Plaines, N.Y.

[22] Filed: Nov. 23, 1970

[21] Appl. No.: 92,169

[52] U.S. Cl..........................................99/130, 99/139
[51] Int. Cl. .................................................A23l 1/04
[58] Field of Search..............................99/130, 148

[56] References Cited

UNITED STATES PATENTS

| | | |
|---|---|---|
| 3,579,355 | 5/1971 | Wyss et al. ..............................99/130 |
| 3,483,002 | 12/1969 | Stein .......................................99/130 |
| 2,861,891 | 11/1958 | Bauernfeind et al. ...................99/130 |

*Primary Examiner*—A. Louis Monacell
*Assistant Examiner*—J. M. Hunter
*Attorney*—Bruno P. Struzzi, Thomas V. Sullivan and Eugene F. Miller

[57] ABSTRACT

Multi-layered desserts having differently colored layers are prepared from a single dry whippable composition comprising gelatin, fat, sugar, emulsifiers for the fat, a fat soluble coloring agent, and a water soluble coloring agent.

7 Claims, No Drawings

MULTI-LAYERED, MULTI-COLORED DESSERTS

BACKGROUND OF THE INVENTION

This application is related to assignee's co-pending application Ser. No. 868,578 now U.S. Pat. No. 3,579,355 filed Oct. 22, 1969 which is a continuation-in-part of Ser. No. 783,738 filed Dec. 13, 1968 now abandoned.

This invention relates to multi-layered gelatin-containing desserts prepared from a single dry whippable composition and more particularly it relates to such desserts which have differently colored layers, their composition and process of preparation.

Stratified gelatin-containing desserts can be formed from a single dry whippable composition containing certain amounts of gelatin, fat, sugar and fat emulsifier. The product is a two-or three-layered dessert comprising a lower layer which is substantially gelatin, an aerated creamy upper layer and, in the case of the three-layered dessert, a middle layer having a chiffon-like texture. This method represents a great saving of time, convenience, labor and refrigeration space over the previously available method of separate preparation and stacking of each desired layer upon the other.

The applicants have now discovered that a multi-layered dessert of the type described and claimed in the above-mentioned pending application can be prepared with the further aesthetic advantage of differently colored layers by incorporating into the composition an edible fat soluble coloring agent. This novel composition processed as described below results in an equally novel self-layering differently-colored dessert product.

SUMMARY OF THE INVENTION

The dessert product of this invention is obtained by forming a dry mix comprising a gelatin portion, sugar, a fat portion where the fat is preferably plated on sugar or combined with sugar in the form of chips, a fat emulsifier, a fat soluble edible coloring agent and a water soluble coloring agent. In whipping the mix with water under the conditions described below the resultant product comprises a substantially gelatin lower layer of given color, a middle layer of chiffon texture and different color and an aerated creamy upper layer of yet another color.

DETAILED DESCRIPTION OF THE INVENTION

The composition of this invention preferably comprises by weight 5 percent to 7 percent gelatin, 7 percent to 11 percent fat, 75 percent to 85 percent sugar, 0.07 percent to 1.3 percent emulsifier and at least trace amounts of a fat soluble edible coloring agent and a water soluble coloring agent.

The particular edible fats to be incorporated in the dessert composition according to this invention may be edible oils, semi-solid or solid fats, or combinations thereof. These fats for example are the usual shortenings such as lard, modified lard, butter, margarine, and various animal and vegetable oil. Representative of the latter are the hydrogenated and non-hydrogenated forms of coconut oil, palm kernel oil, cottonseed oil, peanut oil, olive oil, sunflower seed oil, sesame seed oil, corn oil, safflower oil, poppyseed oil, soybean oil and the like.

In addition to the fat itself, the fat portion of the present composition includes one or more flavors and emulsifying agents for the fat. Representative of such emulsifying agents are lecithin, the mono and diglycerides of fat forming fatty acids, such as mono and diolein monostearin, and dipalmitin, polyglycerol esters of fatty acids; polyoxyalkylene esters of fatty esters of polyhydric alcohols, such as the polyoxyethylene esters of sorbitan distearate; mono- and diesters of glycols and fatty acids such as propylene glycol monostearate; and partial esters of carboxylic acids such as lactic, citric, and tartaric acids with mono and diglycerides of fatty acids, such as glycerol lactopalmitate. The fatty acids used to prepare the emulsifiers include those derived from beef tallow and castor, coconut, cottonseed, mustard seed, palm, peanut, rapeseed, rice bran, soybean, tall and marine oil.

Moreover, the fat portion should exhibit a plastic range after whipping with the gelatin portion according to the recipe hereinafter described, such that it will melt readily at or about mouth temperature. More particularly, the fat portion should show a rapid decrease in solids content over a range between room temperature and body temperature. Thus, it is desirable that between 70°F. and 100°F. there be a sharp drop in the solids content index of the fat portion. The fat portion employed in this invention will preferably have a solids content of about 65.3 percent at 50°F., and a solids content of about 1.8 percent at 110°F. The Wiley melting point range of the fat portion is between about 99°F. and 114°F.

Suitable sugars for use in the invention include any of the commonly used sugars, including sucrose, dextrose, maltose, fructose and lactose, as well as mixtures of these sugars or artificial sweeteners.

The fat-soluble coloring agent is preferably beta-carotene. Its color imports a basically yellow hue in fat solution. Specifically, 24 percent beta-carotene, a commercially-available semi-solid suspension of micronized beta-carotene in a hydrogenated vegetable oil base, would produce the desired results as described below. Generally, any member of the fat-soluble carotenoid family will suffice. Besides beta-carotene, other carotenoids which are workable are apocarotenal (beta-apo-8-carotenal) and bixin (annato extract). The fat soluble coloring agent should be essentially insoluble in water.

The water soluble coloring agent can be any edible dye which dissolves in water, as opposed to colors which are merely dispersed in water, such as the FD & C Lakes. Additionally, the dye should be essentially insoluble in fats or oils.

The most preferred way of making the one package whippable gelatin containing dessert mixes is by mixing about 1 part of the fat portion with about 5 parts of sugar and reducing the fat/sugar admixture to a homogeneous powder so that the fat is plated on the sugar particles. This fat/sugar admixture is then mixed with about 3 parts of additional sugar and about 1 part of the dry gelatin portion to obtain the final single package powdered mixture.

The one package whippable gelatin containing dessert mixes may also be prepared by mixing about 30 percent of the sugar and about two-thirds of the fat portion and reducing the mixture to a homogeneous powder. The resulting powder is then mixed with the remaining fat portion and the mixture is treated so that the fat portion is in the form of chips. The resulting mixture containing fat chips is then added to a package containing the remaining sugar and the gelatin portion to form a single package mix.

EXAMPLE I

A lemon-lime three-layered dessert, having a white upper creamy fat layer, a yellow middle chiffon-like layer and a green lower substantially-gelatin layer was prepared from the following dry whippable composition:

| Ingredient | Grams | Percent |
| --- | --- | --- |
| Sugar | 99.30 | 79.87 |
| Gelatin Portion | | |
| Fumaric Acid | 0.50 | 0.40 |
| Guar Gum | 0.81 | 0.65 |
| Gelatin | 7.54 | 6.08 |
| Adipic Acid | 1.58 | 1.28 |
| Trisodium Citrate | 0.75 | 0.60 |
| Lemon-Lime Flavoring | 0.46 | 0.37 |
| Water Soluble Green Dye | 0.01 | 0.01 |
| Fat Portion | | |
| Hydrogenated Vegetable Oil | 12.92 | 10.41 |
| Diglycerol Monostearate | 0.15 | 0.12 |
| Lecithin | 0.04 | 0.03 |
| 24% Beta-carotene | 0.02 | 0.02 |

The fat, emulsifiers and the fat-soluble coloring agent are heated to about 140°F. in a mixing tank. Next, about 1 part of the melted fat portion and about 5 parts of granulated sugar are simultaneously added to a liquid/solid continuous mixing device to form a fat/sugar paste. The resulting paste is then fed into a five roll refiner where it is crushed to a relatively dry fat/sugar powder, in which the fat is plated on the sugar. The fat/sugar powder is cooled to about 45°F., and then ground into a homogeneous mixture in a Fitz Mill. Next, the homogeneous fat/sugar powder is blended in a solids mixer with about 3 parts of additional granulated sugar and about 1 part of the dry gelatin portion.

About 5 to 6 fluid ounces of boiling water is added to about 115 to 130 grams of dry gelatin-fat admixture in order to melt the fat and solublize the gelatin. This mixture is blended at the low speed of an electric mixer or with a rotary hand beater for 30 seconds to form an emulsion and is then whipped with a rotary hand beater or at high speed of a portable electric mixer for 4 minutes or for 3 minutes with an upright electric mixer, to cool the mixture and solidify and aerate the fats. Then about 10 to 11 fluid ounces of cold water is blended in at low mixer speed to break the emulsion and allow the fats to rise. This mixture is poured into dessert glasses and chilled, gradually separating into a three-layered multi-colored dessert. The lower layer is substantially gelatin and is colored green by the water-soluble dye; however most of the fat-soluble beta-carotene is carried to the middle layer where most of the fat in which it is dissolved settles and imparts a basically greenish-yellow color to that layer. The top layer is mostly white with perhaps a tinge of yellowish-green to it. Not much of the fat-soluble coloring agent is carried by the aerated fat portion into the upper layer.

From the foregoing it is clear that the fat-soluble dye is preferably water insoluble, and the water-soluble dye is preferably fat insoluble, to avoid cross-migration of color between the different layers.

EXAMPLE II

A strawberry-peach flavored three-layered dessert with pink, pale orange and reddish colored layers from top to bottom was prepared according to the process and composition of Example I substituting strawberry-peach flavorings for the lemon-lime and a reddish water-soluble dye for the green dye.

In this case, the orange color in the middle is produced by the basic yellow of the beta-carotene being mixed with trace amounts of the reddish dye, since there are small amounts of water in the fatty middle layer.

In general, the lower layer contains most of the water, with smaller amounts of water in both the upper and middle layers. Most of the fat settles in the middle layer and the upper layer. Thus it is that there will always be some color mixing from layer to layer, but if mutually insoluble colors are used for fat and water, a clear color distinction will appear between all layers all the time.

Having described in detail the preferred embodiments of the invention, and the manner of practicing the same it is to be understood to those skilled in the art to which the invention pertains, that many changes, embodiments, and applications will suggest themselves without departing from the scope of the invention. Accordingly, the disclosure and description herein are merely illustrative and not intended to be limiting in any sense.

What we claim is:

1. A dry whippable dessert composition comprising 5 percent to 7 percent gelatin, 7 percent to 11 percent fat, 75 percent to 85 percent sugar, 0.07 percent to 1.3 percent emulsifier for the fat, a fat-soluble edible coloring agent which is insoluble in water, and a water-soluble edible dye which is insoluble in fats or oils, said fat-soluble coloring agent and said water-soluble dye being of different color, whereby upon successive whipping of the mix with water at various temperatures, a multi-layered, multi-colored gelatin containing dessert is formed when the product cools.

2. The composition of claim 1 where the fat is an emulsified mixture comprising hydrogenated vegetable oil and hydrogenated coconut oil.

3. The composition of claim 1 where the fat-soluble edible coloring agent is selected from the group consisting of beta-carotene, beta-apo-8'-carotenal, and bixin.

4. A process for preparing a multi-layered, multi-colored gelatin containing dessert, comprising, (1) adding about 5 to 6 fluid ounces of boiling water to about 115 to 130 grams of a dry whippable composition comprising 5 percent to 7 percent gelatin, 7 percent to 11 percent fat, 75 percent to 85 percent sugar, 0.07 percent to 1.3 percent emulsifier for the fat, a fat-soluble edible coloring agent which is insoluble in water and a water-soluble edible dye which is insoluble in fats or oils, said fat-soluble coloring agent and said water-soluble dye being of different color, (2) blending the mixture at low speed of an electric mixer or rotary hand beater for about 30 seconds, (3) whipping the mixture at high speed for about 3 to 4 minutes, (4) blending in at low speed about 10 to 11 fluid ounces of cold water and (5) cooling the mixture.

5. The process of claim 4 where the fat-soluble edible coloring agent is selected from the group consisting of beta-carotene, beta-apo-8'-carotenal, and bixin.

6. A process for preparing a multi-layered, multi-colored gelatin-containing dessert, comprising, (1) adding about 5 to 6 fluid ounces of boiling water to about 115 to 130 grams of a dry whippable composition comprising 5 percent to 7 percent gelatin, 7 percent to 11 percent fat, 75 percent to 85 percent sugar, 0.07 percent to 1.3 percent emulsifier for the fat, a fat-soluble coloring agent which is insoluble in water and a water-soluble edible dye which is insoluble in fats or oils, said fat-soluble coloring agent and said water-soluble dye being of different color, (2) dissolving said composition into said water by stirring for at least 30 seconds to form an emulsion, (3) whipping said emulsion for about 3 to 4 minutes to aerate said emulsion and (4) adding about 10 to 11 fluid ounces of cold water to the mixture while stirring.

7. The process of claim 6 where the fat-soluble edible coloring agent is selected from the group consisting of beta-carotene, beta-apo-8'-carotenal, and bixin.

* * * * *